United States Patent
Hoffmann et al.

(10) Patent No.: US 9,127,632 B2
(45) Date of Patent: Sep. 8, 2015

(54) METHOD FOR DETECTING FAULTY COMPONENTS OF AN ELECTRONICALLY REGULATED FUEL INJECTION SYSTEM OF AN INTERNAL COMBUSTION ENGINE

(75) Inventors: Robert Hoffmann, Ruhstorf/Rott (DE); Steffen Lehner, Eichstätt (DE); Anselm Schwarte, Bad Abbach (DE); Simon Ruscheinski, Rain (DE)

(73) Assignee: CONTINENTAL AUTOMOTIVE GMBH, Hannover (DE)

( * ) Notice: Subject to any disclaimer, the term of this patent is extended or adjusted under 35 U.S.C. 154(b) by 57 days.

(21) Appl. No.: 14/004,155

(22) PCT Filed: Feb. 29, 2012

(86) PCT No.: PCT/EP2012/053474
§ 371 (c)(1),
(2), (4) Date: Oct. 1, 2013

(87) PCT Pub. No.: WO2012/119911
PCT Pub. Date: Sep. 13, 2012

(65) Prior Publication Data
US 2014/0033811 A1    Feb. 6, 2014

(30) Foreign Application Priority Data
Mar. 9, 2011  (DE) .................. 10 2011 005 283

(51) Int. Cl.
*F02M 65/00*  (2006.01)
*F02D 41/20*  (2006.01)
(Continued)

(52) U.S. Cl.
CPC ........... *F02M 65/00* (2013.01); *F02D 41/2096* (2013.01); *F02D 41/222* (2013.01); *F02M 65/001* (2013.01); *F02D 2041/2055* (2013.01); *F02M 51/0603* (2013.01); *H02N 2/065* (2013.01)

(58) Field of Classification Search
CPC ................... F02D 2041/2055; F02D 41/2096; F02D 41/222; F02M 51/0603; F02M 65/00; F02M 65/001; H02N 2/065
USPC ...................................... 73/114.49
See application file for complete search history.

(56) References Cited

U.S. PATENT DOCUMENTS 6,253,736 B1 *  7/2001  Crofts et al. ................. 123/498
6,487,505 B1 * 11/2002  Mock et al. ..................... 702/33
(Continued)

FOREIGN PATENT DOCUMENTS

CN    101238281 A    8/2008  ............. F02D 41/38
DE    10323488 A2    12/2004  ............. F02D 41/20
(Continued)

OTHER PUBLICATIONS

International Search Report and Written Opinion, Application No. PCT/EP2012/053474, 15 pages, Aug. 21, 2012.
(Continued)

*Primary Examiner* — Freddie Kirkland, III
(74) *Attorney, Agent, or Firm* — Slayden Grubert Beard PLLC

(57) ABSTRACT

A method for detecting error-containing components of a piezo-injector in an internal combustion engine fuel-injection system is disclosed. The piezo-injector has a piezoelectric actuator and an injection needle driven thereby, and is configured for operation in a partial-stroke mode and a full-stroke mode. First, the internal combustion engine is brought to a defined operational point. Then, the time for the injector needle to strike its stop when said injector needle is opened, as well as the time for the injector needle to strike its needle seat again when said injector needle is closed, are measured. The measured times are compared to normal values determined at the test stand. Parameter(s) for the fuel-injection system are calculated, using different calculation models, and the results are stored. Finally, the calculated parameters of the different calculation models are compared to norm values determined at the test stand, and compared to one another.

18 Claims, 1 Drawing Sheet

(51) Int. Cl.
*F02D 41/22* (2006.01)
*F02M 51/06* (2006.01)
*H02N 2/06* (2006.01)

(56) References Cited

U.S. PATENT DOCUMENTS

| | | | |
|---|---|---|---|
| 7,139,657 B2 | 11/2006 | Bouchain et al. | 701/104 |
| 8,051,704 B2* | 11/2011 | Kim et al. | 73/114.49 |
| 8,061,188 B2* | 11/2011 | Hoffmann et al. | 73/114.45 |
| 8,248,074 B2* | 8/2012 | Perryman et al. | 324/379 |
| 8,296,044 B2* | 10/2012 | Hoffmann et al. | 701/114 |
| 8,875,566 B2* | 11/2014 | Hoffmann et al. | 73/114.45 |
| 8,887,560 B2* | 11/2014 | Beer et al. | 73/114.49 |
| 2006/0082252 A1* | 4/2006 | Allmendinger et al. | 310/316.03 |
| 2009/0309455 A1* | 12/2009 | Hoffmann et al. | 310/317 |
| 2011/0000465 A1 | 1/2011 | Stoecklein et al. | 123/478 |
| 2011/0295485 A1 | 12/2011 | Afsar Malik et al. | 701/102 |
| 2014/0007665 A1* | 1/2014 | Katzenberger et al. | 73/114.48 |
| 2014/0033811 A1 | 2/2014 | Hoffmann et al. | 73/114.49 |

FOREIGN PATENT DOCUMENTS

| | | | | |
|---|---|---|---|---|
| DE | 102006036567 B4 | 9/2008 | | F02D 41/20 |
| DE | 102005040551 B4 | 1/2009 | | F02D 41/00 |
| EP | 1505288 A2 | 2/2005 | | F02D 41/20 |
| EP | 1570165 B1 | 7/2006 | | F02D 41/12 |
| WO | 03/081007 A1 | 10/2003 | | F02D 41/20 |
| WO | 2010/003780 A1 | 1/2010 | | F02D 41/14 |
| WO | 2010/089236 A1 | 8/2010 | | F02D 41/00 |
| WO | 2012/119911 A1 | 9/2012 | | F02D 41/20 |

OTHER PUBLICATIONS

Chinese Office Action, Application No. 201280012299.1, 11 pages, May 27, 2015.

* cited by examiner

METHOD FOR DETECTING FAULTY COMPONENTS OF AN ELECTRONICALLY REGULATED FUEL INJECTION SYSTEM OF AN INTERNAL COMBUSTION ENGINE

CROSS-REFERENCE TO RELATED APPLICATIONS

This application is a U.S. National Stage Application of International Application No. PCT/EP2012/053474 filed Feb. 29, 2012, which designates the United States of America, and claims priority to DE Application No. 10 2011 005283.6 filed Mar. 9, 2011, the contents of which are hereby incorporated by reference in their entirety.

TECHNICAL FIELD

This disclosure relates to a method for detecting faulty components of an electronically regulated fuel injection system of an internal combustion engine.

BACKGROUND

Fault phenomena which occur in modern internal combustion engines and their regulating systems, for example aging of actuators and sensors, fuel leaks, sticking valves, carbonization of nozzle hole and other deposits, leakage currents etc., generally bring about undesired vehicle behavior, such as loss of power, increased emissions or else also an activated fault memory lamp. These fault phenomena can be due to both the air quantity regulation, the exhaust gas recirculation, the hydraulic system and also the electrical system. It is possible for both the sensors and the actuators to be affected. Owing to the high level of complexity of modern injection systems, a direct 1:1 assignment of causes to fault symptoms is often not possible. A fault phenomenon can have a plurality of causes. One cause can lead to a plurality of faults. In particular in the dynamic operating mode, on-board diagnostic strategies only make it possible to a limited extent to identify the cause of the fault in the injection system in a more detailed way, let alone to determine said cause precisely without at the same time having an adverse effect on the system behavior within the scope of the diagnosis. Intrusive tests during the operation of the vehicle are also not desired by the approval authority and/or by the manufacturers since they possibly cause the exhaust gas behavior to be worsened or can be perceived by the driver. In addition, localizing the cause of the fault by a limited number of available on-board sensor information items is restricted.

Due to a lack of precise knowledge of the cause of the fault, this leads in a workshop to high expenditure, often undesired, and as a consequence thereof possibly to components which are still functionally capable per se being unnecessarily replaced or too many components being replaced (trial & error approach). For example, this can result in a functionally capable ECU being replaced or an entire injector set being replaced even though the undesired system behavior was caused, for example, by a single defective injector or a soiled plug in the cable harness.

In addition, an initially moderate fault can, if not discovered, develop over time into a serious fault. This usually results in total failure of, for example, the injection system and therefore in the vehicle becoming immobilized.

DE 10 2006 036 567 B4 discloses a method for determining a functional state of a piezo-injector of an internal combustion engine. In this context, the input variables of a control loop for injecting fuel are the voltage and the charge. Taking a new capacitance and the last stored capacitance values as a basis, the further capacitance profile for the measured piezo-injector is calculated using a mathematical approximation method. An imminent failure of a piezo-injector is detected from the fact that a measured capacitance value is outside a first upper and lower tolerance range around the calculated capacitance profile. The piezo-injector is switched off immediately if the measured capacitance value is outside a second upper and lower threshold range around the calculated capacitance profile, wherein the threshold range includes the tolerance range.

As described above, in a workshop components are often replaced on the basis of suspicion. Alternatively, in a workshop additional sensor systems can be provided for diagnostic purposes and/or manual tests can be performed. Manual interventions into the injection system can, however, lead to a situation in which impurities penetrate the system and components are damaged.

DE 10 2005 040 551 B4 discloses a method for determining a proportion of biodiesel in a fuel for operating a diesel internal combustion engine, in which method the excess air ratio lambda in the exhaust gas of the diesel internal combustion engine is measured, an expected value of the excess air ratio lambda is determined by calculation on the basis of a measured air mass flow rate MAF and a calculated fuel quantity MF, wherein the mathematical relationship lambda=MAF/(14.5×MF) is used, and the proportion of biodiesel is determined from a difference between the measured excess air ratio lambda and the expected value of the excess air ratio lambda which is determined by calculation.

WO 2010/089236 A1 discloses a fault analysis method for an internal combustion engine having a plurality of cylinders. In this known method, an angular speed of the internal combustion engine is determined. Furthermore, a parameter of the combustion process of one of the plurality of cylinders is adapted in order to approximate the times at which the internal combustion engine respectively passes through an angle interval. In order to provide a fault analysis method which makes it possible to detect a defective cylinder, it is determined on the basis of the value of the parameter that the one cylinder of the plurality of cylinders is defective.

A further possible way of calculating an injected fuel quantity is to calculate the fuel quantity from detected impact times of the nozzle needle.

In addition, it is possible to calculate an injected fuel quantity by using the output signals of a cylinder pressure sensor.

Furthermore, WO 2010/003780 A1 discloses taking into account a change in the exhaust gas temperature as a function of the introduced fuel quantity in order to evaluate the function of an injection system.

EP 1 570 165 B1 discloses a method in which what is referred to as a minimum quantity is calculated by using selective actuation of small fuel quantities and observing the effect on the rotational speed signal.

This principle of action of actuating small quantities and evaluating the effects on the rotational speed signal can also be used if a brief ballistic actuation of an injector is replaced by actuation of a stable needle partial-stroke.

The two abovementioned methods assume that it is known from measurements at the test bench what fuel quantity leads to what change in the rotational speed signal. The primary objective is respectively to compensate changes in idle stroke or carbonization of an injector. However, as a result the quality of the fuel is also indirectly taken into account.

As already stated above, it is, however, possible for identical fault phenomena in the system to have different causes. A changed characteristic of the effect of small injection quantities can be caused, if there is no fault in the involved sensors, by incorrect injection quantities, incorrect injection times, changed fuel properties (ignition delay, energy content) and by faults in the fresh air system and exhaust gas recirculation system (influence of the combustion peak temperature). If a temperature sensor which is used for the assessment is not seated directly in the exhaust manifold of the engine but instead, for example, is only seated downstream of the oxidization catalytic converter a possibly changed catalytic efficiency level (exothermic) of the oxidization catalytic converter must then also be taken into account.

An incorrect injection quantity can in turn be caused by carbonization of the injection nozzles, further faults in the injector or else by an incorrectly measured fuel pressure. Customary fuel metering calculations convert a quantity setpoint value into an opening duration of the injection nozzle, specifically as a function of the measured fuel pressure and an assumed fuel density. In fact, a setpoint volume is therefore actuated, not a setpoint mass flow rate. A changed throughflow rate during the carbonization therefore likewise leads to a quantity error, as does an incorrectly measured fuel pressure.

In known systems, the cause/effect chains are varied. A problem with the identification of the cause of a fault which occurs is that there is no actual fixed point present. This applies, in particular, in the case of an on-board diagnosis. Basically, any component may be faulty. Previous approaches to a solution only achieve inadequate success in identifying the cause of faulty behavior of the internal combustion engine.

SUMMARY

One embodiment provides a method for detecting faulty components of a piezo-injector, having a piezo-electric actuator and a nozzle needle driven directly thereby, in the fuel injection system of an internal combustion engine, in which method the piezo-injector can be operated in a partial-stroke mode and a full-stroke mode, comprising: bringing about a defined operating point of the internal combustion engine, measuring the time after which the nozzle needle impacts against its stop during opening of the nozzle needle, and the time after which the nozzle needle impacts against its needle seat again during closing of the nozzle needle, comparing the measured times with standard values determined at the test bench, calculating one or more parameters of the fuel injection system according to respective different calculation models, and storing the results obtained, comparing the calculated parameters of the various calculation models with standard values determined at the test bench, and comparing the described parameters of the various calculation models with one another.

In a further embodiment, the defined operating point comprises one of a load point, a fuel pressure, a defined number of injections, a defined temperature range of cooling water, oil and fuel and a switched-off exhaust gas recirculation system.

In a further embodiment, the method is performed for a plurality of operating points.

In a further embodiment, a calculated parameter is the fuel quantity.

In a further embodiment, a calculated parameter is the engine rotational speed.

In a further embodiment, the comparison of the calculated parameters with standard values determined at the test bench and the comparison of the calculated parameters of the various calculation models with one another are performed individually for each cylinder of the fuel injection system.

In a further embodiment, the comparison of the calculated parameters with standard values determined at the test bench and the comparison of the calculated parameters of the various calculation models with one another are performed for all the cylinders of the fuel injection system.

BRIEF DESCRIPTION OF THE DRAWINGS

Example embodiments of the invention are explained in more detail below with reference to the figures, of which.

DETAILED DESCRIPTION

Some embodiments provide a method for detecting faulty components of an electronically regulated fuel injection system of an internal combustion engine which permits improved self-diagnostics of the vehicle.

The method for detecting faulty components of an electronically regulated fuel injection system of an internal combustion engine as described below may be suitable, for example, for self-ignition internal combustion engines which contain a piezo-common-rail injection system with directly driven injectors.

The disclosed method can be used, for example, for checking a large number of systems of the internal combustion engine including the entire injection system. It is advantageously used in stable operation conditions which are present, for example, in the case of a stationary vehicle in a workshop. However, it can also be performed by an engine control unit of the motor vehicle in the normal operating mode of the motor vehicle.

The execution of the disclosed method can, if appropriate, be initiated from outside the engine control unit, for example by requesting an external test unit.

A further potentially advantageous time for executing the disclosed method is directly before the initial activation of the vehicle. This is because at this time defined operating substances (fuel, oil) which correspond to a first filling standard and have been filled in by trained personnel are present.

In the case of the execution of the disclosed method in a workshop it is to be noted that before the method is started certain mistakes committed by the workshop personnel have to be ruled out. These include faults on the rotational speed sensor wheel, leaks in the high pressure system and filling the fuel tank with an incorrect type of fuel.

In the case of the disclosed method being performed in the normal operating mode of a motor vehicle, the results of various system diagnoses are to be checked before the method is started. These include, for example, a cylinder balancing diagnosis as well as all the diagnoses of the involved sensors and actuators.

Possible advantages of the disclosed method include, for example, that a fixed point which is necessary to identify the possible causes of a fault is provided by the diagnostic properties of the directly driven piezo-injectors used.

The results of the various injection-quantity back-calculation models may have to supply similar results at steady-state operating points and may have a similar profile in the case of a slow change from one operating point to the next operating point. The specified results may be obtained by evaluation using mathematical correlation functions. Precise correspondence of the results may not be necessary, e.g., when there are rapid transitions during the high dynamic operation.

Figure 1:
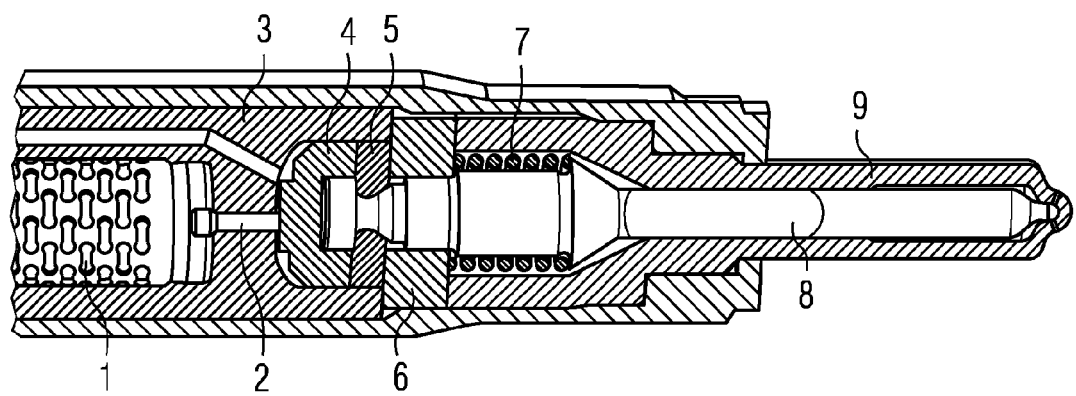
FIG. 1 shows an outline explaining the design of a piezo-injector in which the disclosed method can be used.

FIG. 1 shows an outline explaining the design of a piezo-injector in which the disclosed method can be used. The piezo-injector illustrated has a piezo-actuator 1 provided with a tubular spring, a pin 2, a lever housing 3, a bell 4, a lever 5, a washer 6, a nozzle needle spring 7, a nozzle needle 8 and a nozzle body 9.

The piezo-actuator 1 comprises a multiplicity of individual thin layers which expand when an electrical voltage is applied, i.e. they convert an applied electric voltage into mechanical work or energy. Conversely mechanical effects of the piezo-actuator give rise to electrical signals which can be measured. The achievable expansion of a piezo-actuator is dependent on parameters which include its nominal length, the number of its layers, the quality of the polarization which has taken place and the ratio of its active surface to its total surface. If a piezo-actuator is charged, it remains in its achieved expansion for the duration of the respective injection.

The exemplary embodiment shown in FIG. 1 is a piezo-injector in which the nozzle needle 8 is driven directly by the piezo-actuator 1. For this purpose, the piezo-actuator 1 is connected directly to the nozzle needle 8 via the pin 2, the bell 4 and the lever 5, which are rigid coupling elements which are guided in a positively locking fashion. As a result of this direct connection of the nozzle needle to the piezo-actuator, a reactive application of force from the needle movement to the piezo-actuator is made possible, which application of force can be detected in the capacitance profile. Every application of force into the piezo-actuator results in a change in the measured capacitance.

The nozzle body 9 expands as a function of the temperature. The purpose of the nozzle needle spring 7 is to keep the nozzle needle 8 in its seat. The specified expansion of the nozzle body 9 in the direction of its longitudinal axis, referred to as the lengthening of the nozzle, influences the maximum needle stroke. The rail pressure prevailing in the rail (not shown) also brings about lengthening of the nozzle body and compression of the nozzle needle.

In the case of a needle opening process, the piezo-actuator 1 is firstly charged by energization thereof. The expansion of the piezo-actuator does not begin directly with the energization but instead only with a short time delay. After the idle stroke has been overcome, the expansion of the piezo-actuator 1 is transmitted via the pin 2 to the bell 4, wherein the pin 2 is guided in the lever housing 3. The bell 4 presses symmetrically on both sides of the lever 5, which forms a lever pair. These levers roll on the washer 6 in the manner of a rocker. The force-transmission ratio or travel-transmission ratio is given by the contour of the levers or by the dimensions of the partial distances relative to the support point of the levers on the washer. The respective point of action of the two levers is in a notch on the nozzle needle 8.

The axial pressing force of the piezo-actuator 1 is transmitted to the nozzle needle 8 by the mechanism described above. The nozzle needle is lifted out of its seat as soon as the lever force is larger than the sum of the spring force and the hydraulic force, and the elasticity of the nozzle body 9 no longer ensures that the needle seat follows on with the nozzle needle.

After a defined travel of, for example, 100 μm, which is executed at a pressure of 200 MPa, the needle stop impacts against the washer. A contact force builds up which has a reaction on the piezo-actuator 1.

With such piezo-actuators 1 it is possible to lift the nozzle needle 8 only partially out of its seat and hold it in what is referred to as the partial-stroke. The cleared flow cross section between the nozzle needle and the nozzle body is smaller here than the sum of the cross sections of all the nozzle holes.

The piezo-actuator 1 is discharged at a subsequent closing of the needle. This discharging of the piezo-actuator leads to a contraction in the piezo-actuator. At the start of the discharging process, the piezo-actuator becomes shorter at a high speed. In the further course of the discharging, the speed at which the piezo-actuator becomes shorter drops. The nozzle needle spring 7 accelerates the nozzle needle 8 further in the direction of its needle seat and at the same time accelerates the bell 4 and the pin 2 in the opposite direction. The pin 2 retracts the piezo-actuator 1 again. In this way, an application of force builds up again on the piezo-actuator 1 until the nozzle needle 8 impacts against its seat. Here, the movements of the nozzle needle 8, bell 4 and pin 2 end abruptly, and as a result also the application of force of the pin 2 on the piezo-actuator 1. The latter is discharged further and contracts further until the defined idle stroke is brought about again. Consequently, the injection is already ended before the piezo-actuator is completely discharged.

As has been explained above, in the case of the piezo-injector shown in FIG. 1, the piezo-actuator 1 acts directly on the nozzle needle 8 via rigid coupling elements 2, 4, 5, and vice versa. As a result, it is possible to sense the force effects on the nozzle needle 8 by measuring the electrical voltage at the piezo-actuator 1.

A piezo-actuator has the property of staying in an expanded state achieved by electrical charging at least for as long as is necessary for the present injection process.

Furthermore, it has been stated above that with a directly driven piezo-injector it is possible to operate said piezo-injector in a partial-stroke mode in which the nozzle needle is lifted by only part of the maximum possible travel out of the needle seat and stays there.

The sequence of an example method will be explained below in more detail with reference to an exemplary embodiment. In this exemplary embodiment, the claimed method is performed in a workshop.

Figure 2:
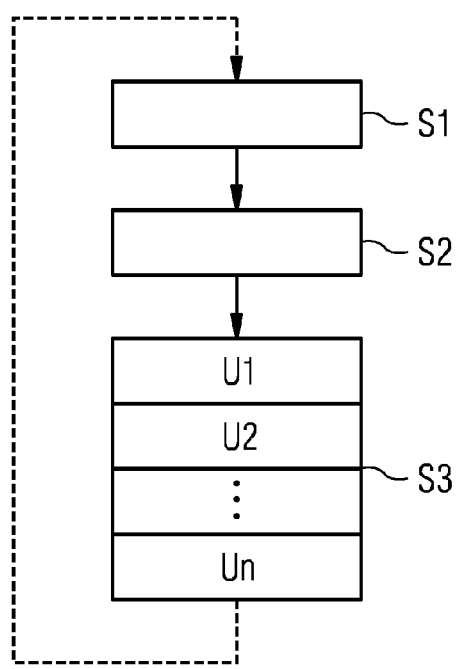
FIG. 2 shows a flowchart illustrating a method according to one embodiment of the invention.

In this context, as illustrated in FIG. 2, in a first step S1 a first operating point is approached and maintained. This first operating point is characterized by a first load point which is described via a first defined fuel quantity and a first defined engine rotational speed, a first defined fuel pressure, a first defined number of injections, for example a small pre-injection and a main injection, a first defined temperature range of cooling water, oil and fuel and a switched-off exhaust gas recirculation system.

This is followed, in a second step S2, by sensing of what is referred to as the OPP2 time and the OPP4 time and a comparison of the acquired time values with associated standard values determined on the test bench. The OPP2 time is to be understood here as meaning the time at which the nozzle needle of the piezo-injector impacts against its stop during an opening process. The OPP4 time is to be understood here as meaning the time at which the nozzle needle of the piezo-injector impacts against its needle seat again during a flowing process of the nozzle needle.

This is followed, in a third step S3, by a comparison of the results of various quantity back-calculation models with standard values determined on the test bench. In this context, comparison or cross-correlation of the various quantity back-calculation models with one another takes place.

In this third step S3, actuation is performed with a small injection quantity and an associated evaluation of the effects on the rotational speed signal is performed as part of a first subroutine U1 by brief ballistic actuation of the injector (method A) and/or by a partial-stroke mode (method B). In this context, the injection quantity is increased incrementally until a change can be detected in the rotational speed signal and/or until the injected minimum quantity is sufficient for the generation of torque. During this incremental increase in the small injection quantity, the respectively associated electrical voltage at the piezo-actuator is measured. As soon as a change can be detected in the rotational speed signal, a transition from "no significance" to "significance" is detected. This corresponds to idle-stroke detection and therefore to a time OPP1 which corresponds to the start of the opening of the nozzle needle during a nozzle needle opening process. This time is also often referred to as the SOI (start of injection) time. If the specified transition is detected, the characteristic variables are stored for the specified significance, i.e. the associated electrical voltage at the piezo-actuator and the associated fuel injection quantity are stored. Furthermore, the respectively associated partial-stroke voltage (=boot level 1, boot level 2) is stored. In a satisfactorily functioning system, there is a fixed relationship between the start of electrical actuation and the respective partial-stroke voltage for each fuel pressure.

Furthermore, in this first subroutine U1, the fuel quantity is calculated from what is referred to as the exhaust gas lambda and the air mass (calculation a), the fuel quantity is calculated from a change in the angular speed of the camshaft (calculation b), the fuel quantity is calculated from the detected impact times OPP2 and OPP4 of the nozzle needle (calculation c) as well as preferably also the fuel quantity is calculated using a cylinder pressure sensor (calculation d). In these calculation models there must be a characteristic profile for the cylinder in question here.

Finally, in this first subroutine U1 the fuel quantity calculated from the OPP2 and the OPP4 times is compared with the fuel quantity which has been calculated according to the above method A and/or B, and the results are stored.

The first subroutine U1 then ends.

Subsequently, the steps described within the scope of the first subroutine U1 are repeated for each of the further cylinders of the internal combustion engine in further subroutines U2, . . . , Un.

When this repetition is also ended, a second operating point is approached and maintained. This second operating point is characterized by a second load point which is described by a second defined fuel quantity and a second defined engine rotational speed, a second defined fuel pressure, a second defined number of injections, a second defined temperature range of cooling water, oil and fuel and a switched-off exhaust gas recirculation system.

Then, the same tests which were described above in relation to the first operating point are performed for this second operating point. This is indicated by the dashed line in FIG. 2.

Then, a third operating point is approached and maintained. This third operating point is characterized by a third load point which is described by a third defined fuel quantity and a third defined engine rotational speed, a third defined fuel pressure, a third defined number of injections, a third defined temperature range of cooling water, oil and fuel and a switched-off exhaust gas recirculation system.

Then, the same tests which were described above in relation to the first operating point are also performed for this third operating point.

Then, in this exemplary embodiment the method is ended and the test results which are obtained are evaluated. Within the scope of this evaluation, in particular the following fault phenomena can be identified:

Fault phenomenon 1: if the boot levels with respect to a cylinder are satisfactory, the times OPP2 and OPP4 satisfactory and the calculations b or the methods A and/or B show a deviation and the calculation c shows no deviation, the combustion quality of this cylinder may be poor and there may be a loss of compression and possibly increased friction with respect to the piston rings.

Fault phenomenon 2: if a boot level at one cylinder is too high, if the times OPP2 and OPP4 are satisfactory and if the calculation b or the methods A and/or B show a deviation and the calculation c shows no deviation, an injection quantity error may be present with respect to this cylinder. Furthermore, there may be massive carbonization with respect to this cylinder. In addition, increased friction may be present in the injector. Differentiating between the presence of carbonization and the presence of friction can be performed on the basis of the absolute value of the piezo-capacitance and the capacitance gradient.

Fault phenomenon 3: if a boot level is too high at all the cylinders, if the times OPP2 and OPP4 are satisfactory with respect to all the cylinders, if the methods A and B show deviations, wherein the volumetric metering of fuel is satisfactory but a higher fuel quantity than expected is required for generating torque, poor combustion quality is present at all the cylinders, wherein the fuel quality may be poor, the fuel may not be at the assumed pressure, the high pressure sensor in-range drift can lead to values which are clearly too low or the exhaust gas recirculation system may have been incorrectly continuously opened. This has to be checked by the workshop personnel.

Fault phenomenon 4: if an excessively low boot level 1 is present with respect to a cylinder, an excessively low idle stroke (blind lift) is present with respect to this cylinder.

Fault phenomenon 5: if an excessively high boot level 1 is present with respect to a cylinder, an excessively high idle stroke (blind lift) is present with respect to this cylinder.

Fault phenomenon 6: if the boot level 1 and/or the boot level 2 are too low with respect to all the cylinders, a high pressure sensor in-range drift at values which are clearly too high is present.

What is claimed is:

1. A method for detecting faulty components of a piezo-injector of a fuel injection system of an internal combustion engine, the piezo-injector having a piezo-electric actuator and configured to drive a nozzle needle, and being configured for operation in a partial-stroke mode and a full-stroke mode, the method comprising:
 achieving a defined operating point of the internal combustion engine,
 measuring a first time after which the nozzle needle impacts against a stop during an opening of the nozzle needle, and a second time after which the nozzle needle impacts against a needle seat during a closing of the nozzle needle,
 comparing the first and second measured times with predetermined time values,
 calculating one or more parameters of the fuel injection system using multiple different calculation models, and storing the calculated parameters from the multiple calculation models,
 comparing the calculated parameters from the multiple calculation models with predetermined parameter values,
 comparing the calculated parameters from the multiple calculation models with one another; and
 determine if a fault condition is present based on the comparison of the first and second measured times with predetermined values, the comparison of the calculated parameters from the multiple calculation models with predetermined parameter values and the comparison of the calculated parameters from the multiple calculation models with one another.

2. The method of claim 1, wherein the defined operating point comprises one of a load point, a fuel pressure, a defined number of injections, a defined temperature range of a fluid, and a switched-off status of an exhaust gas recirculation system.

3. The method of claim 1, comprising performing the method for a plurality of operating points.

4. The method of claim 1, wherein the one or more calculated parameters comprises a fuel quantity.

5. The method of claim 1, wherein the one or more calculated parameters comprises an engine rotational speed.

6. The method of claim 1, comprising performing (a) the comparison of the calculated parameters with standard values determined on a test bench and (b) the comparison of the calculated parameters of the multiple calculation models with one another individually for each cylinder of the fuel injection system.

7. The method of claim 1, comprising performing (a) the comparison of the calculated parameters with standard values determined on a test bench and (b) the comparison of the calculated parameters of the multiple calculation models with one another for all cylinders of the fuel injection system.

8. The method of claim 1, wherein the predetermined time values are determined at a test bench.

9. The method of claim 1, wherein the predetermined parameter values are determined at a test bench.

10. A fuel injection system of an internal combustion engine of a motor vehicle, comprising:
    a fuel injector associated with a cylinder of the internal combustion engine, the fuel injector comprising a piezoelectric actuator and configured to drive a nozzle needle, and
    an engine control unit configured to detect a fault associated with the piezo-injector by:
    achieving a defined operating point of the internal combustion engine,
    measuring a first time after which the nozzle needle impacts against a stop during an opening of the nozzle needle, and a second time after which the nozzle needle impacts against a needle seat during a closing of the nozzle needle,
    comparing the first and second measured times with predetermined time values,
    calculating one or more parameters of the fuel injection system using multiple different calculation models, and storing the calculated parameters from the multiple calculation models,
    comparing the calculated parameters from the multiple calculation models with predetermined parameter values,
    comparing the calculated parameters from the multiple calculation models with one another, and
    determine if a fault is present based on the comparison of the first and second measured times with predetermined values, the comparison of the calculated parameters from the multiple calculation models with predetermined parameter values and the comparison of the calculated parameters from the multiple calculation models with one another.

11. The fuel injection system of claim 10, wherein the defined operating point comprises one of a load point, a fuel pressure, a defined number of injections, a defined temperature range of a fluid, and a switched-off status of an exhaust gas recirculation system.

12. The fuel injection system of claim 10, wherein the engine control unit is configured to perform the method for a plurality of operating points.

13. The fuel injection system of claim 10, wherein the one or more calculated parameters comprises a fuel quantity.

14. The fuel injection system of claim 10, wherein the one or more calculated parameters comprises an engine rotational speed.

15. The fuel injection system of claim 10, wherein the engine control unit is configured to perform (a) the comparison of the calculated parameters with standard values determined on a test bench and (b) the comparison of the calculated parameters of the multiple calculation models with one another individually for each cylinder of the fuel injection system.

16. The fuel injection system of claim 10, wherein the engine control unit is configured to perform (a) the comparison of the calculated parameters with standard values determined on a test bench and (b) the comparison of the calculated parameters of the multiple calculation models with one another for all cylinders of the fuel injection system.

17. The fuel injection system of claim 10, wherein the predetermined time values are determined at a test bench.

18. The fuel injection system of claim 10, wherein the predetermined parameter values are determined at a test bench.

* * * * *